United States Patent Office

Re. 24,373
Reissued Oct. 15, 1957

24,373

THICKENED HAIR DYEING COMPOSITION COMPRISING POLYHYDROXYL COMPOUND AND ALKANOLAMINE

Wolfgang Max Josef Eckardt and Siegfried Roland Preisinger, Bad Segeberg, Holstein, Germany, assignors to Lever Brothers Company, New York, N. Y., a corporation of Maine No Drawing. Original No. 2,769,748, dated November 6, 1956, Serial No. 273,352, February 25, 1952. Application for reissue July 1, 1957, Serial No. 669,915

Claims priority, application Germany February 26, 1951

11 Claims. (Cl. 167—88)

Matter enclosed in heavy brackets [ ] appears in the original patent but forms no part of this reissue specification; matter printed in italics indicates the additions made by reissue.

This invention relates to a process for dyeing hair and to thickened hair dyeing compositions.

Hair dyeing compositions based on oxidation dyes such as p-toluylene diamine have been prepared in a thickened or paste form. These compositions are a great improvement over the free-flow hair dyes previously used, which had the great disadvantage of readily running from hair during use, redyeing parts of the hair which had already been dyed, and also staining the clothes and face of the user. However, these thickened compositions, being emulsions or suspensions, have not been transparent, so that it has been difficult to observe the progress of the dyeing operation. Moreover, due to the use of the oxidation dyes there is an increased risk of forming darker patches as a result of lack of uniformity of the hair, whilst originally white patches may not be dyed to a sufficient depth of shade, particularly in the case of coarse hair, which does not absorb dye easily.

In order to overcome the disadvantage of lack of absorption power in coarse hair, a pretreatment with ammoniacal hydrogen peroxide has been required. This however due to the high alkalinity of the solution is not beneficial to the hair keratin. Another expedient has been the provision of an increased ammonia content in the thickened hair dyeing composition so as to increase the ability of the coarse hair to absorb the dye. Such hair dyeing preparations have, however, had a pH of about 10 in order to achieve the desired effect. Here again the alkalinity is high enough to have a harmful effect on the hair keratin.

By the addition of hair-protecting substances, such as fatty acid-glycerides, higher fatty alcohols, cholesterol or wool wax, to thickened hair dyeing compositions, the harmful effect of excess free ammonia required to increase the absorption of the dye by the hair is to a certain degree overcome. In Swiss Patent No. 197,425, for example, it is proposed to add nonalkaline hair softening carriers, such as higher fatty alcohols and the like, and to abandon the addition of free ammonia. Although the hair is indeed protected from harmful effects, the dyeing is not satisfactory in all instances, and in the use of this composition a pretreatment with alkaline hydrogen peroxide cannot be avoided. When the treatment with alkaline hydrogen peroxide is effected, however, the whole dyeing process becomes troublesome and the structure of the hair is injured by the alkaline hydrogen peroxide rather than by the hair dye.

It has been proposed in German Patent No. 582,521 that triethanolamine soaps be included in hair dyeing compositions. These substances, however, only increase the wetting action of the composition and do not enhance the dyeing effect. The composition is not effective on coarse hair without an alkaline pretreatment.

Attempts have also been made to use triethanolamine in hair dyeing compositions, but satisfactory results have not been obtained, as is pointed out in French Patent No. 900,825, beginning at line 23.

Accordingly, it is an object of the present invention to provide a thickened hair dyeing composition based on oxidation dyes which will dye hair in an unobjectionable manner without a pretreatment with alkaline hydrogen peroxide.

It is also an object of the invention to provide a thickened hair dyeing composition which has a relatively low pH, within the range from about 7 to about 9, so that the hair keratin is not affected during the dyeing process.

In accordance with the instant invention, a hair dyeing composition is provided containing as essential ingredients a polyhydroxyl compound which tends to promote absorption and dyeing and an alkanolamine having a carbon chain of low molecular weight which tends to equalize the dyeing. This combination of ingredients makes it possible to dispense with the alkaline peroxide pretreatment heretofore required, even in the case of coarse hair. Because this combination of components is effective at a pH below about 9, to which pH the composition can be adjusted by addition of an ammonium compound, the harmful effects of a high alkalinity in the hair dyeing composition also are reduced or eliminated. A further advantage of this composition is that hair can be dyed to a uniformly lighter shade than its natural color without pretreatment.

In a preferred embodiment, the composition also contains a thickening agent in an amount to increase its viscosity to a point at which the thickened composition will adhere to the hair for the time required to dye it.

The composition is effective with the usual oxidation dyes, i. e., aromatic diamines or aminophenols, such as p-toluylenediamine, p-aminophenol, and their salts. There is a large group of these useful dyes known to those skilled in this art and the few mentioned above are merely illustrative. p-Phenylenediamine is toxic and would not ordinarily be used.

Polyhydroxyl compounds which promote absorption and dyeing have from 2 to about 12 carbon atoms and from 2 to about 12 hydroxyl groups. The compound preferably is an aliphatic polyhydroxyl compound, such as sorbitol, ethylene glycol, glycerine, pentaerythritol, xylitol, adonitol, diethylene glycol, mannitol, triethylene glycol, erythritol, dulcitol, propanediol-1,2, butyleneglycol-1,3 and propylene glycol. The above examples are all of saturated aliphatic compounds. Unsaturated aliphatic compounds can also be employed, if desired. Further, polyhydroxyl compounds containing aromatic and cycloaliphatic groups can also be utilized. The polyhydroxyl compound should be water-soluble or -dispersible.

Alkanolamines having at least one alkylol chain of low molecular weight, up to about 12 carbon atoms, and preferably from 6 to 9 carbon atoms and from [6] *1* to [9] *3* hydroxyl groups are effective dye equalizers. Typical alkylol groups, for example, are methylol, ethylol, and propylol. The amino nitrogen can be primary, secondary or tertiary, thus bearing at least one alkylol group, up to three alkylol groups, the remaining nitrogen valences being taken with hydrogen or alkyl groups of low molecular weight such as methyl, ethyl and propyl. These compounds can be used in the form of their acid salts. Triethanolamine and its salts has been found to be very satisfactory and is preferred by reason of its availablity and cost. However, diethanolamine, tripropanolamine, monoethanolamine, monobutylolamine, dipropanolamine, monopropanolamine, etc., and their salts, also can be used with advantage. Although the literature indicates that alkanolamines are capable of dyeing hair red, the present research has not been able to confirm this.

The pH of the thickened hair dyeing composition according to the invention should be between about 7 and about 9, which is below that of the alkaline thickened hair dyeing compositions used heretofore. The protection thus afforded to the hair is particularly noticeable in the gloss and firmness of the hair after treatment. If necessary, the pH can be adjusted by adding an ammonium compound, i. e., either free ammonia, ammonium hydroxide or an ammonium salt, such as ammonium carbonate, ammonium acetate, ammonium phosphate, ammonium chloride, ammonium tartrate, ammonium sulfate, ammonium nitrate, ammonium formate, and ammonium bromide. If alkanolamine salts are used, ammonia or ammonium hydroxide would be used, but ammonium salts would be added if an alkanolamine is employed. The ammonium compound is employed in an amount to provide a pH within the stated range, and preferably approximating 8.5 to 9.0.

Taking into account the effect of the polyhydroxl compound to enhance the absorption and dyeing, and the effect of the alkanolamine to equalize the dyeing, it is usually desirable to employ from about 3 to about 15% of the alkanolamine, preferably from 4 to 6%, and between about 2 and about 6% of the polyhydroxyl compound by weight of the composition. The amount of ammonium compound required to buffer a composition containing these proportions of the polyhydroxyl compound and alkanolamine to a pH of from 7 to 9 usually will lie within the range from about 3 to about 5%.

In addition to the above ingredients, the hair dye may contain a thickening agent, which may be a water-soluble cellulose derivative, such as hydroxyethyl cellulose, methyl cellulose and carboxymethylcellulose (glycolic acid cellulose ethers), usually used as the sodium salt, or a water-soluble alginate. These thickening agents are employed in an amount to transform the composition into a smooth cream or paste which will tend to adhere to the hair for as long a time as desired. The composition desirably flows only slowly, and preferably flows only under pressure. These thickening agents have the additional property of producing a transparent or clear composition, thus facilitating the observation of the progress of the dyeing. Many of the compositions thickened with these agents in accordance with the invention have thixotropic properties. Where transparency is not required, however, it is possible to employ other thickening agents, such as starch, wheat flour. Usually from 1 to 10% of a thickening agent will produce a composition having the desired viscosity.

A small amount of a surface active agent, such as a synthetic detergent, can also be included, usually about 1%, in order to facilitate wetting of the hair by the dye and do away with a subsequent soap shampoo to remove excess dye. As exemplary of such agents, paraffin sulfonates, sulfonated alcohols, sulfonated fatty acids, fatty alcohol sulfates and fatty acid sulfates can be mentioned. For example, sulfonated coconut oil fatty acids, lauryl sulfate, myristyl sulfate, and sodium palmitic methyl tauride can be employed.

Small quantities of fatty alcohols or colloidally soluble wool wax derivatives, in particular, condensation products of these substances with polyhydroxyalkylene sorbitol, can be added for the care of the hair.

The addition of hydrocarbons, such as paraffin oil, in a small amount, usually less than 1%, will facilitate combing of the dyed hair.

The transparency of the thickened hair dyeing composition of the invention is not affected by the addition of the above-mentioned substances.

The composition is applied to the hair in such a way as to saturate it thoroughly therewith. This may conveniently be accomplished by combing or brushing out the hair and by saturating it with a comb wet with the composition, and by like means known to those skilled in the art.

The intensity of shade of color obtained primarily depends upon the dye concentration and the dyeing temperature. Best results are obtained at a temperature within the range from 20 to 30° C. and when the dye concentration does not exceed 5%. For most purposes, a dye concentration within the range from 1 to 4% is preferable, but much less than 1% may be adequate under certain circumstances.

It will be appreciated by those skilled in the art that the intensity of shade will also be dependent to some extent upon the dyeing temperature and upon the nature of the dye. For this reason, specific conditions adapted for every dyeing cannot be given, but those skilled in the art will know from the above disclosure and the following examples what conditions to employ in a given case.

The composition and process of the invention is applicable primarily to human hair, but may also be employed with animal fibers of all types, including wool.

The following examples of compositions according to the present invention are given by way of illustration.

EXAMPLE 1

| | Parts |
|---|---|
| p-Toluylene diamine sulfate | 6.0 |
| p-Aminophenol hydrochloride | 0.5 |
| Resorcinol | 2.5 |
| Isopropyl alcohol | 60.0 |

The above are mixed together, and to this mixture are added 931 parts of 2.4% sodium carboxymethyl cellulose paste heated to 50° C. and containing 4.2% triethanolamine, 2.0% ethylene glycol, 2.4% ammonium tartrate and 1.0% paraffin sulfonate. A transparent thickened hair dye composition is obtained which, developed with oxidizing agents in the usual way, dyes even hair of low absorptive capacity a uniform dark blonde color without pretreatment. The pH of the hair dyeing composition made in this way is 8.7.

EXAMPLE 2

To a hair dye charge according to Example 1 there are added 931 parts of 2.4% sodium carboxymethyl cellulose paste heated to 50° C. and containing 5.0% triethanolamine, 3.3% ammonium chloride, 2.2% pentaerythritol and 1.2% paraffin sulfonate. A transparent thickened hair dye with properties equal to those described in Example 1 is obtained. The pH of this hair dyeing composition is 8.6.

EXAMPLE 3

To a hair dye charge according to Example 1 there are added 931 parts of sodium carboxymethyl cellulose paste containing 2.4% of the cellulose ether, 4.0% triethanolamine, 2.2% paraffin sulfonate, 2.6% triammonium phosphate and 2.5% sorbitol. A transparent thickened hair dye possessing the same good properties as described in Examples 1 and 2 is obtained. After dyeing the hair is soft and very easy to set. The pH of this hair dyeing composition is 8.9. 0.3% paraffin oil may also be added to this composition.

EXAMPLE 4

To a hair dye charge according to Example 1 there are added 931 parts of a 2.4% sodium carboxymethyl cellulose paste containing 3.8% diethanolamine, 2.4% ammonium tartrate, 2.0% ethylene glycol, 1.0% of a condensation product of wool wax with polyhydroxyalkylene sorbitol and 1.0% paraffin sulfonate. A transparent thickened hair dye composition is obtained which absorbs and equalizes well. The pH of the hair dyeing composition is 8.9.

The compositions according to the present invention allow hair to be dyed with advantage at a pH substantially below that used at present, thus doing away with the harmful effects of high alkalinity. The compositions are particularly suitable for the dyeing of coarse hair, of low absorptive power, which hitherto has required either an alkaline pre-treatment or a high alkalinity, in most cases a pH of about 10, in order to produce satisfactory results. If conventional ingredients are added, transparent pastes are obtained which can be packed in tubes and applied with ease.

All parts and percentages are by weight.

The terms "alkanolamine" and "oxidation dye" as used in the claims include the salts thereof.

We claim:

1. A hair dyeing composition comprising an amount up to about 5% of an oxidation hair dye; an alcoholic, non-dyeing absorption- and dye-promoting polyhydroxyl compound containing from about 2 to about 12 carbon atoms and from about 2 to about 12 hydroxyl groups in an amount within the range from about 2% to about 6%; a dye-equalizing alkanolamine having at least one alkylol chain of low molecular weight up to about 12 carbon atoms and from [6] *1* to [9] *3* hydroxyl groups in an amount within the range from about 3% to about 15%; and a compound capable of supplying ammonium ions in an amount within the range from about 3% to about 5%; the said composition having a pH from 7 to 9.

2. A composition in accordance with claim 1 in which the polyhydroxyl compound is ethylene glycol.

3. A composition in accordance with claim 1 in which the polyhydroxyl compound is pentaerythritol.

4. A composition in accordance with claim 1 in which the polyhydroxyl compound is sorbitol.

5. A composition in accordance with claim 1 in which the alkanolamine is triethanolamine.

6. A composition in accordance with claim 1 in which the alkanolamine is diethanolamine.

7. A composition in accordance with claim 1 in which the oxidation dye is an arylene diamine.

8. A composition in accordance with claim 7 in which the oxidation dye is a p-toluylene diamine.

9. A composition in accordance with claim 1 in which the dye is an aminophenol.

10. A composition in accordance with claim 9 in which the aminophenol is p-aminophenol.

11. A hair dyeing composition which comprises an oxidation hair dye in an amount within the range from about 1% to about 4%; an alcoholic, non-dyeing absorption- and dye-promoting polyhydroxyl compound containing from about 2 to about 12 carbon atoms and from about 2 to about 12 hydroxyl groups in an amount from about 2% to about 6%; a dye-equalizing alkanolamine having at least one alkylol chain of low molecular weight up to about 12 carbon atoms and from [6] *1* to [9] *3* hydroxyl groups in an amount within the range from about 4% to about 6%; and a compound capable of supplying ammonium ions in an amount within the range from about 3% to about 5%; the said composition having a pH from 7 to 9.

References Cited in the file of this patent or the original patent

UNITED STATES PATENTS

| | | |
|---|---|---|
| 1,663,202 | Kritchevsky | Mar. 20, 1928 |
| 1,705,818 | Kern | Mar. 29, 1929 |
| 1,923,178 | Ulrich | Aug. 22, 1933 |
| 2,042,698 | Basch | June 2, 1936 |
| 2,126,964 | Kerth | Aug. 16, 1938 |
| 2,236,970 | Goldfarb | Apr. 1, 1941 |
| 2,305,356 | Luckenbach | Dec. 15, 1942 |

FOREIGN PATENTS

| | | |
|---|---|---|
| 307,948 | Great Britain | Mar. 14, 1929 |
| 27,781 | Australia | Dec. 9, 1930 |
| 366,961 | Great Britain | Feb. 9, 1932 |
| 466,172 | Great Britain | May 19, 1937 |
| 107,057 | Australia | Apr. 20, 1939 |

OTHER REFERENCES

Cox: "Hair Dyes, II," The Analyst, July 1940, pp. 393–398, esp. at p. 393.

Evans: "Progress in Hair Coloring," Drug and Cosmetic Industry, January 1949, pp. 37, 38 and 117–121.

Janistyn: "Riechstoffe, Seifen, Kosmetika," vol. II, Huthig, Heidelberg, 1950, pp. 451–455.